United States Patent Office 3,325,490
Patented June 13, 1967

3,325,490
SUBSTITUTED 1-HYDROXYDIBENZOPYRANS
James W. Bolger, Canoga Park, Calif., assignor to Rexall Drug and Chemical Company, Los Angeles, Calif., a corporation of Delaware
No Drawing. Filed Feb. 23, 1965, Ser. No. 434,660
16 Claims. (Cl. 260—247.2)

This invention relates to compositions of matter classified in the art of chemistry as substituted 1-hydroxydibenzopyrans.

The invention sought to be patented, in its first product composition aspect, is described as residing in the concept of a chemical compound having a molecular structure in which the 1-hydroxy-3-lower alkyl-6-oxo-7,8,9,10-tetrahydro-6H-dibenzo[b,d]pyran nucleus bears at the 2-position a di-lower alkylaminomethyl radical and the hereinafter described equivalents thereof.

The invention sought to be patented, in its second product composition aspect, is described as residing in the concept of a chemical compound having a molecular structure in which the 1-hydroxy-3,6,6-tri-lower alkyl-7,8,9,10-tetrahydro-6H-dibenzo[b,d]pyran nucleus bears at the 2-position a di-lower alkylaminomethyl radical, and the hereinafter described equivalents thereof.

As used throughout this application, the term "lower alkyl" embraces both straight and branched chain alkyl radicals containing from 1 to 6 carbon atoms, for example methyl, ethyl, n-propyl, isopropyl, tert-butyl, n-amyl, n-hexyl, 2-ethylbutyl and the like.

The tangible embodiments of this invention both as free bases and in the form of their acid-addition salts, possess the inherent general physical properties of being solid crystalline materials. Elemental analysis, as well as ultra-violet and infra-red spectral data and nuclear magnetic resonance (NMR) data, taken together with the aforementioned physical properties, nature of the starting material and mode of synthesis, positively confirm the structure of the compounds sought to be patented.

The tangible embodiments of their invention possess the inherent applied use characteristics of having significant pharmacological activity without adverse toxicity as antipyretic, anti-inflammatory and hypotensive agents as determined by recognized and accepted pharmacological tests procedures.

The manner and process of making and using the invention will now be generally described so as to enable one skilled in the art of chemistry to make and use the same as follows:

The preparation of the tangible embodiments of this invention is illustrated by the following reaction sequence:

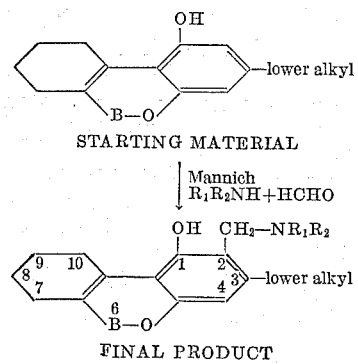

wherein B is

(first product composition aspect) or -C(di-lower alkyl)-(second product composition aspect) and wherein $NR_1R_2$ is di-lower alkylamino or its hereinafter described equivalents.

In accordance with the hereinabove depicted reaction sequence a 6-oxo- or 6-di-lower alkyl-1-hydroxy-3-lower alkyl - 7,8,9,10 - tetrahydro - 6H - dibenzo [b,d] pyran is subjected to the well-known Mannich reaction, thereby to produce the 6-oxo- or 6-di-lower alkyl-2-di-lower alkyl-aminomethyl-1-hydroxy-3-lower alkyl - 7,8,9,10 - tetrahydro-6H-dibenzo[b,d]-pyrans which comprise the tangible embodiments of this invention. The reaction is carried out by treating the starting material with an appropriate di-lower alkylamine, for example dimethylamine, diethylamine, and the like, in substantially equimolar proportions, in the presence of a source of formaldehyde, for example paraformaldehyde, in an inert organic solvent such as, for example, ethanol, tetrahydrofuran and the like, at a temperature of up to the reflux temperature of the solvent. The product is recovered from the reaction mixture by conventional techniques of extraction, filtration, crystallization and the like.

The starting materials for the preparation of the tangible embodiments of this invention are known compounds that are readily prepared by conventional techniques of chemistry. The starting materials for the preparation of the 6-oxo-substituted final products are described by Ahmad and Desai (J. Univ. Bombay 6, Pt. II, 89 (1937) and are prepared by the condensation of ethyl cyclohexanone-2-carboxylate with orcinol in the presence of phosphorus oxychloride and the starting materials for the preparation of the 6-di-lower alkyl-substituted final products are described by Adams and Baker (J. Am. Chem. Soc., 62:2405 (1940) who treated the Ahmad and Desai compound with excess methylmagnesium iodide.

In carrying out the reaction, a mono-lower alkylamine such as methylamine, ethylamine, isopropylamine and the like, a phenyl-lower alkylamine such as benzylamine, phenethylamine and the like, or a saturated cyclic organic base of the formula HNRR wherein each R is lower alkyl linked through a methylene bridge or a hetero-oxygen, nitrogen or sulfur atom and lower alkyl substituted derivatives thereof, such as piperidine, pyrrolidine, piperazine, morpholine, 2-methylmorpholine, 3-ethylpyrrolidine, N-methyl piperazine and the like are the full equivalents of a di-lower alkylamine, yielding final products bearing $NR_1R_2$ substitution corresponding to the reactant used which have the same utility as the final products prepared utilizing a di-lower alkylamine. In addition, lower aliphatic aldehydes of the formula RCHO wherein R is lower alkyl may be employed, such as acetaldehyde, propionaldehyde, butyraldehyde and the like, thereby to prepare final products wherein the methylene bridge linking the $NR_1R_2$ radical with the 2-position of the nucleus bears a lower alkyl substituent which are the full equivalents to the final products bearing an unsubstituted methylene bridge.

Starting materials bearing one or more lower alkyl substituents at the 7-, 8-, 9- or 10-position are prepared by the same techniques described in the Ahmad et al. and Adams et al. papers referred to hereinabove, such lower alkyl substituted starting materals being the full equivalents of the specific starting materials depicted in the hereinabove described reaction with a Mannich base, thereby resulting in final products bearing the same lower alkyl substitution at the 7-, 8-, 9- or 10-position as in the starting materials. Such products have the same utility as the specific products depicted in the above reaction sequence and are included within the scope of the tangible embodiments of this invention.

It has also been found that when the Mannich base and formaldehyde source are each present in the reaction mixture in a molar ratio of at least 2 moles to each mole of starting material, the resulting final product bears a di-lower alkylaminomethyl radical or its above described equivalents at both the 2- and the 4-position of the nucleus. Such di-substituted final products have the same utility as the mono-substituted products described hereinabove and are included within the scope of the tangible embodiments of this invention.

The tangible embodiments of this invention, in free base form, may, if desired, be converted into their non-toxic pharmaceutically acceptable acid-addition and quaternary ammonium salts. Salts which may be formed comprise, for example, salts with inorganic acids, such as the hydrochloride, hydrobromide, hydroiodide, sulfate, phosphate or the like. They may also comprise salts with organic acids, including monobasic acids such as the acetate or the propionate, and especially those with hydroxy organic acids and dibasic acids, such as citrate, tartrate, malate and maleate. Pharmaceutically, the salt will not be substantially more toxic than the compound itself and, to be acceptable, it should be able to be incorporated into conventional liquid or solid pharmaceutical media. Among the useful quaternary ammonium salts are those formed by such alkyl halides as methyl iodide, n-hexyl bromide and the like. Such pharmaceutically useful acid-addition and quaternary ammonium salts are the full equivalents of the bases from which they are derived and are included within the scope of this invention.

The tangible embodiments of this invention, either as free bases or in the form of a non-toxic pharmaceutically acceptable acid-addition or quaternary ammonium salt, can be combined with conventional pharmaceutical diluents and carriers to form such dosage forms as tablets, suspensions, solutions, suppositories and the like.

The best mode contemplated by the inventor for carrying out his invention will now be set forth as follows:
The following examples illustrate the preparation of tangible embodiments of this invention in its first product composition aspect.

EXAMPLE 1

*2-dimethylaminomethyl - 1 - hydroxy-6-oxo-3-methyl-7,8, 9,10-tetrahydro-6H-dibenzo[b,d]pyran hydrochloride*

1-hydroxy-3-methyl - 6 - oxo-7,8,9,10-tetrahydro-6H-dibenzo[b,d]pyran (26.8 g., 0.115 mole), prepared as described by Ahmed and Desai (J. Univ. Bombay 6 Pt. II, 89 (1937)), parafolmaldehyde (3.45 g., 0.115 mole) and 35% aqueous dimethylamine (14 g., 0.115 mole) are placed in tetrahydrofuran in a sealed container and shaken for approximately 72 hours. Additional paraformaldehyde (0.5 g.) is added and the reaction mixture set to reflux for 6 hours, followed by a second addition of paraformaldehyde (0.5 g.) and 2 more hours of refluxing. The reaction mixture is concentrated in vacuo to an oil that is taken up in ether. Sufficient ethereal hydrogen chloride is added to acidity with congo red indicator. The hydrochloride salt (30.5 g.) of the product precipitates and is recovered by conventional techniques of filtration, washing and crystallization. The product melts with decomposition, 260°–262° C.

*Analysis.*—Calculated for $C_{17}H_{23}NO_3Cl \cdot \frac{1}{4}H_2O$: C, 62.19%; H, 6.91%; N, 4.27%; Cl, 10.80%; O, 15.84%. Found: C, 61.97%; H, 7.15%; N, 4.43%; Cl, 10.56%; O, 15.52%.

EXAMPLE 2

*2-diethylaminomethyl - 1 - hydroxy-6-oxo-3-methyl-7,8,9, 10-tetrahydro-6H-dibenzo[b,d]pyran hydrochloride*

In the same manner as described in Example 1, 1-hydroxy - 3 - methyl-6-oxo-7,8,9,10-tetrahydro-6H-dibenzo[b,d]pyran (26.8 g., 0.115 mole) is treated with paraformaldehyde (3.45 g., 0.115 mole) and diethylamine (8.5 g., 0.115 mole) to yield 25.5 g. of the product in the form of its hydrochloride salt, M.P. 215°–217° C. d.

*Analysis.*—Calculated for $C_{19}H_{26}NO_3Cl \cdot \frac{1}{8}H_2O$: C, 64.30%; H, 7.47%; N, 3.94%; Cl, 9.99%; O, 14.29%. Found: C, 64.22%; H, 7.55%; N, 3.83%; Cl, 9.35%; O, 14.18%.

EXAMPLE 3

*2-benzylaminomethyl-1-hydroxy-3-methyl-6-oxo-7,8,9,10-tetrahydro-6H-dibenzo[b,d]pyran*

In the same manner as described in Example 1, 1-hydroxy - 3 - methyl-6-oxo-7,8,9,10-tetrahydro-6H - dibenzo[b,d]-pyran (26.8 g., 0.115 mole) is treated with paraformaldehyde (3.45 g., 0.115) and benzylamine (12.3 g., 0.115 mole to yield 13.3 g. of the free base, M.P 180°–182° C.

*Analysis.*—Calculated for $C_{22}H_{23}NO_3$: C, 75.62%; H, 6.63%; N, 4.01%. Found: C, 75.14%; H, 6.61%; N, 3.91%.

EXAMPLE 4

*2-pyrrolidinomethyl-1-hydroxy-3-methyl-6-oxo-7,8,9,10-tetrahydro-6H-dibenzo[b,d]pyran hydrochloride*

Paraformaldehyde (3.45 g.) and pyrrolidine (8.29 g.) are mixed with 200 ml. tetrahydrofuran 26.8 g. 1-hydroxy - 3 - methyl-6-oxo-7,8,9,10-tetrahydro-6H-dibenzo[b,d] pyran are added and the mixture is stirred for 16 hours. Excess solvent is removed in vacuo and the residue dissolved in 500 ml. methylene chloride, washed twice with 50 ml. 5% sodium hydroxide, washed with water and finally dried over magnesium sulfate. Evaporation of the methylene chloride yields 29 g. pale yellow solid which on recrystallization from methanol yields the desired product, M.P. 149°–150° C.

*Analysis.*—Calculated for $C_{19}H_{23}NO_3$: C, 72.82%; H, 7.40%; N, 4.47%. Found: C, 72.21%; H, 6.59%; N, 4.98%.

EXAMPLE 5

*2-piperidinomethyl-1-hydroxy-3-methyl-6-oxo-7,8,9,10-tetrahydro-6H-dibenzo[b,d]pyran*

In the same manner as described in Example 1, 1-hydroxy-3-methyl - 6 - oxo-7,8,9,10-tetrahydro-6H-dibenzo[b,d]pyran (26.8 g., 0.115 mole) is treated with paraformaldehyde (3.45 g., 0.115 mole) and piperidine (9.8 g., 0.115 mole) to yield 19.6 g. of the free base, M.P. 140°–142° C.

*Analysis.* — Calculated for $C_{20}H_{25}NO_3 \cdot \frac{1}{4}H_2O$: C, 72.37%; H, 7.74%; N, 4.22%; O, 15.66%. Found: C, 72.82%; H, 7.74%; N, 4.04%; O, 15.20%.

EXAMPLE 6

*2-morpholinomethyl-1-hydroxy-3-methyl-6-oxo-7,8,9,10-tetrahydro-6H-dibenzo[b,d]pyran*

In the same manner as described in Example 1, 1-hydroxy - 3 - methyl-6-oxo-7,8,9,10-tetrahydro-6H-dibenzo[b,d]pyran (26.8 g., 0.115 mole) is treated with paraformaldehyde (3.45 g., 0.115 mole) and morpholine (10 g., 0.115 mole) to yield 22.2 g. of the free base, M.P. 162°–164° C.

*Analysis.*—Calculated for $C_{19}H_{23}O_4N$: C, 69.28%; H, 7.04%; N, 4.25%. Found: C, 69.05%; H, 6.87%; N, 3.85%.

EXAMPLE 7

2-(N-methylpiperazino)methyl-1-hydroxy-3-methyl-6-oxo-7,8,9,10-tetrahydro-6H-dibenzo[b,d]pyran

In the same manner as described in Example 1, 1-hydroxy-3-methyl-6-oxo-7,8,9,10-tetrahydro - 6H - dibenzo[b,d]pyran (26.8 g., 0.115 mole) is treated with paraformaldehyde (3.45 g., 0.115 mole) and N-methylpiperazine (11.6 g., 0.115 mole) to yield 20.6 g. of the free base, M.P. 187°–189° C.

*Analysis.*—Calculated for $C_{20}H_{26}N_2O_3$: C, 70.15%; H, 7.65%; N, 8.18%. Found: C, 70.06%; H, 7.58%; N, 8.58%.

The following examples are illustrative of the preparation of tangible embodiments of this invention in its second produce composition aspect.

EXAMPLE 8

2 - dimethylaminomethyl - 1 - hydroxy - 3,6,6 - trimethyl-7,8,9,10-tetrahydro-6H-dibenzo[b,d]pyran hydrochloride

1 - hydroxy - 3,6,6-trimethyl-7,8,9,10-tetrahydro-6H-dibenzo[b,d]pyran (10 g., 0.041 mole) is dissolved in absolute ethanol (50 ml.) and the solution added to an ethanol solution (50 ml.) containing 25% aqueous dimethylamine (7.37 g., 0.041 mole) and paraformaldehyde (1.23 g., 0.041 mole). The mixture is allowed to stand at room temperature for 1 hour and is then refluxed for 3 hours. The reaction mixture is concentrated to dryness, redissolved in ether and washed with two portions of 5% aqueous sodium hydroxide, followed by drying over anhydrous magnesium sulfate. Acidification with gaseous hydrogen chloride yields 11 g. of product that is recrystallized from methanol-isopropanol, M.P. 275°–280° C.

*Analysis.*—Calculated for $C_{19}H_{28}NO_2Cl$: C, 67.54%; H, 8.35%; N, 4.14%; Cl, 10.50%. Found: C, 67.24%; H, 7.90%; N, 4.42%; Cl, 10.60%.

EXAMPLE 9

2-diethylaminomethyl-1-hydroxy-3,6,6-trimethyl-7,8,9,10-tetrahydro-6H-dibenzo[b,d]pyran

In accordance with the procedure of Example 8, 1-hydroxy - 3,6,6 - trimethyl - 7,8,9,10 - tetrahydro - 6H - dibenzo[b,d]pyran (12.2 g., 0.05 mole) is treated with 1.5 g. paraformaldehyde and 3.65 g. diethylamine in 125 ml. absolute ethanol to yield 7.4 g. product, which on recrystallization from chloroform-ethanol has a melting point of 147°–149° C.

*Analysis.*—Calculated for $C_{21}H_{31}NO_2$: C, 76.55%; H, 9.48%; N, 4.25%. Found: C, 76.33%; H, 9.45%; N, 4.19.

EXAMPLE 10

2-pyrrolidinomethyl-1-hydroxy-3,6,6-trimethyl-7,8,9,10-tetrahydro-6H-dibenzo[b,d]pyran

In accordance with the procedure of Example 8, 1-hydroxy - 3,6,6 - trimethyl - 7,8,9,10 - tetrahydro - 6H - dibenzo[b,d]pyran (12.2 g., 0.05 mole) is treated with 1.5 g. paraformaldehyde and 3.56 g. pyrrolidine in 125 ml. absolute ethanol to yield 9.3 g. of product. Recrystallization from chloroform-ethanol yields materials having a melting point of 149°–151° C.

*Analysis.*—Calculated for $C_{21}H_{29}O_2N$: C, 77.02%; H, 8.93%; N, 4.28%. Found: C, 76.96%; H, 8.72%; N, 4.31%.

EXAMPLE 11

2-piperidinomethyl-1-hydroxy-3,6,6-trimethyl-7,8,9,10-tetrahydro-6H-dibenzo[b,d]pyran

In accordance with the procedure of Example 8, 1-hydroxy - 3,6,6 - trimethyl - 7,8,9,10 - tetrahydro - 6H - dibenzo[b,d]pyran (12.2 g. 0.05 mole) is treated with 1.5 g. paraformaldehyde and 4.25 g. piperidine in 125 ml. absolute ethanol to yield 7.9 g. product which on recrystallization from absolute ethanol has a melting point of 154°–156° C.

*Analysis.*—Calculated for $C_{22}H_{31}NO_2$: C, 77.37%; H, 9.15%; N, 4.10%. Found: C, 77.52%; H, 9.29%; N, 4.07%.

EXAMPLE 12

2-morpholinomethyl-1-hydroxy-3,6,6-trimethyl-7,8,9,10-tetrahydro-6H-dibenzo[b,d]pyran

In accordance with the procedure of Example 8, 1-hydroxy - 3,6,6 - trimethyl - 7, 8, 9, 10-tetrahydro - 6H - dibenzo[b,d]pyran (28.0 g., 0.115 mole) is treated with 3.45 g. paraformaldehyde and 10.0 g. morpholine in 300 ml. absolute ethanol to yield 14.5 g. product, melting point of 176°–178° C.

*Analysis.* — Calculated for $C_{21}H_{29}O_3N \cdot \frac{1}{4}H_2O$: C, 72.42%; H, 8.57%; N, 4.03%; O, 14.95%. Found: C, 72.74%; H, 8.42%; N, 4.01%; O, 14.52%.

EXAMPLE 13

2-(N-methylpiperazino)methyl-1-hydroxy-3,6,6-trimethyl-7,8,9,10-tetrahydro-6H-dibenzo[b,d]pyran

In accordance with the procedure of Example 8, 1-hydroxy - 3,6,6 - trimethyl - 7,8,9,10 - tetrahydro - 6H - dibenzo[b,d]pyran (12.2 g., 0.05 mole) is treated with 1.5 g. paraformaldehyde and 5.0 g. N-methylpiperazine in 125 ml. absolute ethanol to yield 9.5 g. product which on recrystallization from chloroform-ethanol has a melting point of 160°–162° C.

*Analysis.*—Calculated for $C_{22}H_{32}N_2O_2$: C, 74.12%; H, 9.05%; N, 7.86%. Found: C, 73.86%; H, 8.68%; N, 8.01%.

The following example is illustrative of the preparation of equivalent tangible embodiments of this invention wherein the nucleus bears di-lower alkylaminomethyl radicals at both the 2- and 4-positions:

EXAMPLE 14

2,4 - di(Dimethylaminomethyl) - 1 - hydroxy - 3,6,6 - trimethyl-7,8,9,10 - tetrahydro - 6H - dibenzo[b,d]pyran dihydrochloride

In the same manner as described in Example 8, 1-hydroxy - 3,6,6 - trimethyl - 7,8,9,10 - tetrahydro - 6H - dibenzo[b,d]pyren (10 g., 0.041 mole) is treated with an excess of dimethylamine and an excess of paraformaldehyde to yield 9 g. of the product in the form of its dihydrochloride salt, M.P. 306°–308° C.

*Analysis.* Calculated for $C_{22}H_{36}N_2O_2Cl_2$: C, 61.23%; H, 8.42%; N, 6.50%; Cl, 16.44%. Found: C, 61.07%; H, 8.51%; N, 6.65%; Cl, 16.31%.

The subject matter which the applicant regards as his invention is particularly pointed out and distinctly claimed as follows:

What is claimed is:

1. 2 - di - lower alkylaminomethyl - 1 - hydroxy - 6 - oxo - 3 - methyl - 7,8,9,10 - tetrahydro - 6H - dibenzo[b,d]pyran.

2. 2 - dimethylaminomethyl - 1 - hydroxy - 6 - oxo - 3 - methyl - 7,8,9,10 - tetrahydro - 6H - dibenzo[b,d]pyran.

3. 2 - diethylaminomethyl - 1 - hydroxy - 6 - oxo - 3 - methyl - 7,8,9,10 - tetrahydro - 6H - dibenzo[b,d]pyran.

4. 2 - pyrrolidinomethyl - 1 - hydroxy - 6 - oxo - 3 - methyl - 7,8,9,10 - tetrahydro - 6H - dibenzo[b,d]pyran.

5. 2 - piperidinomethyl - 1 - hydroxy - 6 - oxo - 3 - methyl - 7,8,9,10 - tetrahydro - 6H - dibenzo[b,d]pyran.

6. 2 - morphyolinomethyl - 1 - hydroxy - 6 - oxo - 3 - methyl - 7,8,9,10 - tetrahydro - 6H - dibenzo[b,d]pyran.

7. 2 - (N - methylpiperazino)methyl - 1 - hydroxy - 6 - oxo - 3 - methyl - 7,8,9,10 - tetrahydro - 6H - dibenzo[b,d]-pyran.

8. 2 - benzylaminomethyl - 1 - hydroxy - 6 - oxo - 3 - methyl-7,8,9,10-tetrahydro-6H-dibenzo[b,d]-pyran.

9. 2 - di - lower alkylaminomethyl - 1 - hydroxy - 3,6,6 - trimethyl-7,8,9,10-tetrahydro-6H-dibenzo-[b,d]pyran.

10. 2 - dimethylanminomethyl - 1 - hydroxy - 3,6,6 - trimethyl - 7,8,9,10 - tetrahydro - 6H - dibenzo[b,d]pyran.

11. 2 - diethylaminomethyl - 1 - hydroxy - 3,6,6 - trimethyl - 7,8,9,10 - tetrahydro - 6H - dibenzo[b,d]pyran.

12. 2 - pyrrolidinomethyl - 1 - hydroxy - 3,6,6, - trimethyl - 7,8,9,10 - tetrahydro - 6H - dibenzo[b,d]pyran.

13. 2 - piperidinomethyl - 1 - hydroxy - 3,6,6 - tri - methyl - 7,8,9,10 - tetrahydro - 6H - dibenzo[b,d]pyran.

14. 2 - morpholinomethyl - 1 - hydroxy - 3,6,6 - trimethyl - 7,8,9,10 - tetrahydro - 6H - dibenzo[b,d]pyran.

15. 2 - (N - methylpiperazino)methyl - 1 - hydroxy - 3,6,6 - trimethyl - 7,8,9,10 - tetrahydro - 6H - dibenzo - [b,d]pyran.

16. 2,4 - di(dimethylaminomethyl) - 1 - hydroxy-3,6, 6 - trimethyl - 7,8,9,10 - tetrahydro - 6H - dibenzo[b,d] pyran.

No references cited.

ALEX MAZEL, *Primary Examiner.*

JOSE TOVAR, *Assistant Examiner.*